United States Patent [19]
Raynes

[11] Patent Number: 5,866,821
[45] Date of Patent: *Feb. 2, 1999

[54] APPARATUS FOR A TEMPERATURE COMPENSATION OF A CATHETER TIP PRESSURE TRANSDUCER

[75] Inventor: John W. Raynes, Sandy, Utah

[73] Assignee: Becton Dickinson and Company, Franklin Lakes, N.J.

[ * ] Notice: The term of this patent shall not extend beyond the expiration date of Pat. No. 5,146,788.

[21] Appl. No.: 15,077

[22] Filed: Feb. 8, 1993

Related U.S. Application Data

[63] Continuation of Ser. No. 872,803, Apr. 23, 1992, abandoned, which is a continuation of Ser. No. 602,571, Oct. 25, 1990, Pat. No. 5,146,788.

[51] Int. Cl.$^6$ .............................. G01L 7/00; G01L 9/06; G01L 9/08
[52] U.S. Cl. ............................... 73/708; 73/726; 73/727; 128/675
[58] Field of Search .............................. 73/708, 721, 727, 73/720, 726; 338/4, 42; 128/672, 675

[56] References Cited

U.S. PATENT DOCUMENTS

| 3,447,362 | 6/1969 | Pien .......................................... 73/88.5 |
| 3,646,815 | 3/1972 | Martin et al. .............................. 73/398 |
| 3,836,796 | 9/1974 | Solomon et al. ........................ 307/310 |
| 3,841,150 | 10/1974 | Pearson .................................... 73/88.5 |
| 3,956,927 | 5/1976 | Pearson .................................... 73/88.5 |
| 4,196,382 | 4/1980 | Bryzek ...................................... 323/75 |
| 4,202,218 | 5/1980 | Romo ........................................ 73/708 |
| 4,226,125 | 10/1980 | Waugh ...................................... 73/708 |
| 4,320,664 | 3/1982 | Rehn et al. ................................ 73/708 |
| 4,355,537 | 10/1982 | vander Have ............................. 73/708 |
| 4,362,050 | 12/1982 | Okayama et al. ........................ 73/708 |
| 4,362,060 | 12/1982 | Okayama et al. ........................ 73/708 |
| 4,399,515 | 8/1983 | Gross ........................................ 364/571 |
| 4,446,527 | 5/1984 | Runyan ..................................... 364/558 |
| 4,556,807 | 12/1985 | Yamada et al. .......................... 307/491 |
| 4,598,381 | 7/1986 | Cucci ........................................ 364/558 |
| 4,667,516 | 5/1987 | Schulz ....................................... 73/708 |
| 4,715,003 | 12/1987 | Keller et al. .............................. 73/708 |
| 4,765,188 | 8/1988 | Krechmery et al. ..................... 73/708 |
| 4,858,615 | 8/1989 | Meinema ................................. 128/668 |
| 5,135,002 | 8/1992 | Kirchner et al. ........................ 128/672 |
| 5,146,788 | 9/1992 | Raynes ..................................... 73/708 |

FOREIGN PATENT DOCUMENTS

| 0071962 | 2/1983 | European Pat. Off. .......... G01L 9/06 |
| 54-54661 | 1/1979 | Japan . |
| 61-215934 (A) | 9/1986 | Japan . |
| 63-187131 (A) | 8/1988 | Japan . |

OTHER PUBLICATIONS

Patent Abstracts of Japan, European Patent Office, Publication No. JP57044830, 13 Mar. 1982, *Pressure Detecting Device*, Hitachi Ltd.

(List continued on next page.)

*Primary Examiner*—Joseph L. Felber
*Attorney, Agent, or Firm*—Eric M. Lee

[57] ABSTRACT

A compensation circuit for a resistance bridge corrects errors in the response of signal outputs thereof and has a voltage controlled current source across a power input and a ground reference providing a bridge excitation output current proportional to a fixed circuit reference voltage. A single resistor adjusts positive or negative values of the fixed part of the offset errors in the signal outputs response. Another resistor adjusts positive or negative slope of the temperature dependent part of the offset errors in the signal outputs response. A method compensates the offset errors with steps of energizing the bridge and measuring the output and resistance at two temperatures and at two pressures. The measurements are used to find correction resistances for variations in bridge offset, temperature and pressure response.

9 Claims, 4 Drawing Sheets

OTHER PUBLICATIONS vol. 13, No. 540 (P–969) (3888), Dec. 5, 1989, *Output Voltage Adjusting Method in Pressure Sensor Circuit*, No. 1–223322 (A), 6 Sep. 1989, Tokyo Electric.

vol. 13, No. 540 (P–864) (3528A); Apr. 27, 1989, *Zero Point and Temperature Compensating Circuit*, No. 1–10142, 13 Jan. 1989, Derufuai K.K.

2353 Measurement Techniques, vol. 25 (1982), Nov., No. 11, New York, U.S.A., *Compensating the Temperature Error of a Strain Guage with an Additional Signal*, 1983 Plenum Publishing Corporation.

APPARATUS FOR A TEMPERATURE COMPENSATION OF A CATHETER TIP PRESSURE TRANSDUCER

This application is a continuation, of application Ser. No. 07/872,803, filed Apr. 23, 1992, now abandoned, which is a continuation of application Ser. No. 07/602,571, filed Oct. 25, 1990, now U.S. Pat. No. 5,146,788.

FIELD OF THE INVENTION

This invention relates to a compensation circuit for a sensor to correct temperature and more particularly the compensation circuit with specifically selected resistors for temperature, fixed and other characteristics of the sensor.

BACKGROUND OF THE INVENTION

Blood pressure transducers or probes, consisting of miniature sensors mounted on the distal end of a catheter, are commonly used to measure blood pressure in patients. The advantages of this type of blood pressure sensing include greatly increased signal fidelity and frequency response. Numerous methods of fabricating the sensors have been developed. One common method uses a piezoresistive technique, where one or more resistors are deposited on a pressure sensitive silicon diaphragm. These resistors are usually connected in a Wheatstone bridge configuration, although other configurations are also used.

A common method of fabricating piezoresistive pressure sensors typically includes the placement of an additional temperature sensing element on the same chip in close proximity to the pressure sensing resistors. Temperature sensing devices are needed due to the tendency of piezoresistive bridge sensors to exhibit changes in output with increasing or decreasing temperature. Their function is either to act in a manner which opposes the temperature characteristics of the sensor, or to provide a signal, proportional to the chip temperature, to external circuitry which corrects the temperature characteristics of the sensor signal outputs.

In addition to the temperature characteristics described above, the sensors normally have unwanted fixed offset signals at zero pressure, of varying magnitude from device to device, and also have variations in their sensitivity to pressure. These variations in offset and sensitivity, as well as the variations in the temperature characteristics, must be individually adjusted in each device by a process known as "trimming". The name derives from the most common process of performing this adjustment, namely the use of a laser to change the resistance of particular sensor elements, or of other passive or active circuit elements connected in a network about the sensor to effect the desired changes at the sensor's signal outputs.

The trimming process can include the programming of a digital memory device as a part of a sensor assembly, said sensor assembly including the sensor and mechanical and electrical connections required for operation. Information in the digital memory device is retrieved later by a digital processing circuit designed to receive the signal output from the sensor at the time of use, and mathematically removes the unwanted variations in the signal outputs based upon the information stored in the digital memory device.

A particular application for catheter tip sensing requires that the size of the sensor, and also the number of wire connections to the diaphragm be kept minimum due to overall size constraints of that application. Little room exists for additional circuit elements in close proximity to the pressure sensor and the number of electrical connections to the sensor is limited. It is difficult to integrate digital memory elements on the same silicon chip as the pressure sensor, due to incompatibilities in processing techniques.

In the manufacture of medical transducers, there is an increasing trend toward disposable devices with lower risk of infection and which are convenient for clinics and hospitals to use, since there is no need to sterilize the devices. In order for disposable devices to be practical they must be inexpensive to manufacture. In the case of a disposable transducer, this means that the cost of the circuit elements (sensor and trim circuit) in the disposable portion of the product must be minimized, and the processing time to perform the trim operation must be kept short.

Temperature compensation methods for pressure transducers have been described in U.S. Pat. Nos. 3,841,150, 3,956,927, 3,836,796, 4,556,807, 3,646,815, 3,841,150, 4,196,382 and 4,320,664. Separate temperature sensing devices on the chip achieve compensation. Methods which involve the use of digital or microprocessor computing circuits to compensate the pressure signal have been described in U.S. Pat. Nos. 4,226,125, 4,399,515, 4,446,527, 4,598,381, 4,765,188, and 4,858,615. Those methods and circuits reduce the time required to trim, since the error terms inherent in the sensor are stored in an easily programmed non-volatile digital memory. Since the error terms are unique to each sensor, this requires that a digital memory device be programmed and be a part of each sensor assembly. This increases the cost and the number of electrical connections necessary between the transducer/memory assembly and its receiving amplifier circuit. All of these techniques also require an independent temperature sensing element or reference element in addition to the pressure sensor.

U.S. Pat. No. 4,715,003 describes a technique of exciting the bridge with a constant current source, and using the voltage at the power input to the bridge as a direct indication of bridge temperature, without additional temperature sensing elements. This technique however also relies on the use of digital circuitry, and a digital memory device programmed with unique correction constants, and is subject to the limitations described. Other techniques for compensating piezoresistive bridge sensors use passive resistor networks having negligible temperature coefficients with respect to the temperature coefficient of the bridge sensor resistors. As a result, the placement of the network close to the bridge sensor is not of concern. Resistor networks are connected to the bridge in various series/shunt combinations, with particular values adjusted to achieve the desired result at the signal outputs of the bridge.

Networks, when combined with the resistors in the bridge, form complex circuits which cannot be easily solved to determine the appropriate resistance values for a given amount of offset and temperature compensation. It is a property of networks that an adjustment for temperature compensation affects the fixed offset or gain at the signal outputs, and vice versa. As a result, the trimming of these devices is an iterative process, in that the response of the sensor must be reverified one or more times during trimming to achieve the desired correction.

U.S. Pat. No. 3,447,362 discloses a technique as described in the two previous paragraphs, where the interactions between error sources during the trim process are minimized, and the resistance values required for compensation can be determined by algebraic formula. This technique requires an open, or broken, connection at one of the four bridge nodes, so that resistance is inserted within two of the bridge arms. This requires an additional wire connection on the sensor, adding to fabrication costs and increasing the surface area of the sensor needed for wire terminations. The need exists for a simple analog temperature compensation technique which minimizes the number of unique resistors and adjustments necessary to achieve compensation but does not require additional temperature sensing elements or special sensor connections and for a method that can be performed in a fast and noniterative manner.

SUMMARY OF THE INVENTION

A preferred embodiment of a compensation circuit for a resistance bridge with a power input, a ground reference and signal outputs including a positive signal output and a negative signal output of the resistance bridge corrects for errors in a response across the signal outputs of the resistance bridge. The compensation circuit most preferably has an offset reference generator to receive a fixed circuit reference voltage for generating a reference offset voltage.

A voltage controlled current source connects across the power input and the ground reference. The voltage controlled current source may have a bridge excitation output current directly proportional to the fixed circuit reference voltage. A buffer amplifier with a buffer input connects to the power input; the buffer amplifier is preferably a voltage follower generating a buffer output voltage proportional to the power input voltage. An instrumentation amplifier with positive and negative terminals connects to the positive and negative signal outputs respectively to generate an initial output proportional to the response therefrom. A programmable gain amplifier receives the initial output from the instrumentation amplifier and provides a compensated output which is independent of the resistance bridge pressure response. A gain correction part of the compensation network adjusts the gain of the programmable gain amplifier to correct for variations in the resistance bridge pressure response.

A compensation network preferably includes an offset correction part to receive the buffer output voltage and the ground reference. The compensation network may generate an initial offset current in response to the buffer output voltage and may vary proportionately with the resistance bridge temperature change providing a temperature dependent part of the initial offset current.

An offset correction amplifier receives the initial offset current, the buffer output voltage and the fixed circuit reference voltage and generates a correction signal to counteract offset errors in the signal outputs. The buffer output voltage and the initial offset current vary proportionately to temperature change in the resistance bridge and thereby provide a temperature dependent part of the correction signal. A reference input of the instrumentation amplifier may receive the correction signal and modify the initial output. The offset error preferably has a fixed part and a temperature dependent part which are counteracted within the offset correction amplifier by the interactions of the buffer output voltage, the fixed circuit reference voltage and the initial offset current. The offset correction part of the compensation network has a single resistor to adjust the fixed part and another single resistor to adjust the temperature dependent part so that the adjustment for the fixed part does not affect the adjustment of the temperature dependent part. The offset correction amplifier has specific resistances so that the single resistor may adjust positive or negative values of the offset error fixed part. The other single resistor for the temperature dependent part adjusts positive or negative slope of the offset error temperature dependent part.

A method for compensating temperature dependent and fixed offset errors of a resistance bridge is also a part of the preferred invention. The method may have the steps of energizing the resistance bridge, measuring the offset and resistance of the resistance bridge at a first temperature T1 and at zero pressure, measuring the response of the resistance bridge at the first temperature T1 and at a pressure P1 for determining the unit change resistance bridge pressure response, measuring the offset and resistance of the resistance bridge at a temperature T2 and at zero pressure and determining the unit change in the output and resistance of the resistance bridge with temperature. Then the determinations and measurements of the preceding steps may be used to calculate the values of three resistors to select and include them in the compensation network to correct for fixed and temperature dependent parts of the offset error and variations in resistance bridge response to applied pressure at the resistance bridge signal outputs.

DETAILED DESCRIPTION OF THE DRAWINGS

Figure 1:
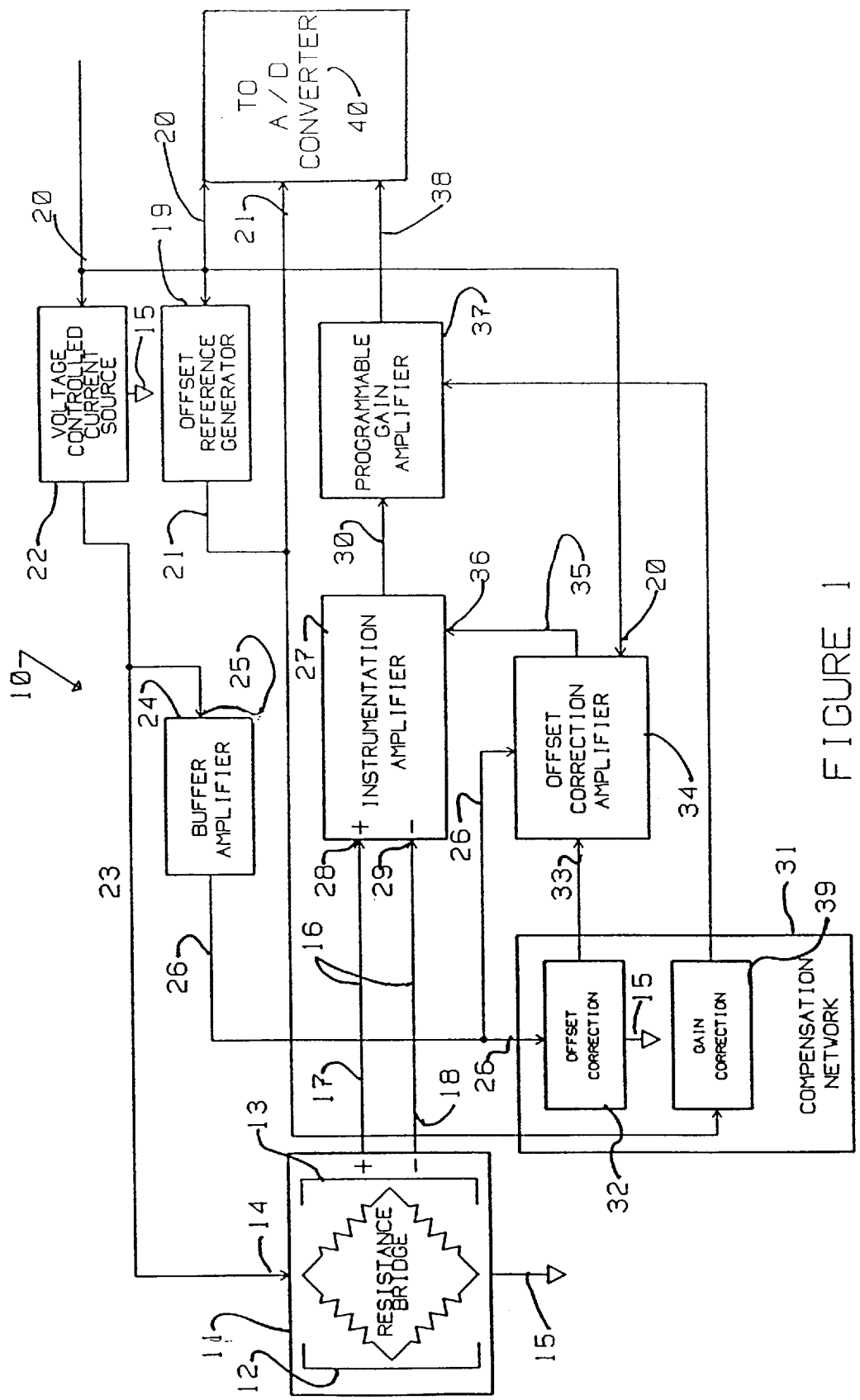
FIG. 1 is a block diagram of the preferred embodiment of the present invention. The diagram shows the functions and interconnections of the major circuit blocks.

While this invention is satisfied by embodiments in many different forms, there is shown in the drawings and will herein be described in detail, a preferred embodiment of the invention, with the understanding that the present disclosure is to be considered as exemplary of the principles of the invention and is not intended to limit the invention to the embodiment illustrated. The scope of the invention will be measured by the appended claims and their equivalents.

An improved technique for compensating silicon based piezoresistive pressure sensors eliminates the need for independent temperature sensing elements and requires no digital memory circuits to codify compensation constants. A minimum number of passive circuit elements are required as part of a catheter pressure probe. No additional sensor connections are necessary beyond the four Wheatstone bridge connections, and no digital processing circuitry is needed for the sensor signal. Significant reductions in manufacturing time for trimming can be achieved over other analog techniques by use of the method described.

In FIG. 1 the configuration of the circuit blocks used in a preferred compensation circuit 10 are shown. One circuit block is a resistance bridge 11 of a Wheatstone configuration with signal outputs 16 providing the resistance bridge response to changes in pressure across a diaphragm or thin flexible member to which the bridge is attached. The resistance bridge 11 is also responsive to changes in the magnitude of voltage applied across a power input 14 and a ground reference 15. The resistance bridge response at the signal outputs 16 is uncompensated, containing offset, sensitivity, and temperature dependent errors. A compensation network 31 is another circuit block and has circuit components with their values or characteristics chosen to compensate for the offset, sensitivity, and temperature dependent errors in the resistance bridge response. The values or characteristics of these components are different for each resistance bridge 11 and these components are usually part of an assembly having the resistance bridge as a sensor. It will be shown herein how three discrete resistors, with values determined by simple algebraic relationships, can compensate for errors in the resistance bridge response using circuits to be described. The other circuits shown in FIG. 1 have functions as described herein and are designed so that the component values of these circuits are the same, regardless of a particular resistance bridge response.

In FIG. 1 the compensation circuit 10 for the resistance bridge 11 is shown. The resistance bridge 11 includes a pair of arms 12 and 13 wherein each includes a pair of resistors. As will be described in FIG. 3, one of each pair of resistors increases with strain and the other decreases with strain. The resistance bridge 11 has the power input 14, the ground reference 15, and the signal outputs 16 including a positive signal output 17 and a negative signal output 18. The signal outputs response is in the preferred application a function of pressure applied to the resistance bridge 11 and an electrical signal applied to the power input 14.

The compensation circuit 10 also includes an offset reference generator 19 to receive a fixed circuit reference voltage 20 for generating a reference offset voltage 21 between the potentials of the ground reference 15 and the fixed circuit reference voltage 20. It is preferred that the reference offset voltage 21 be exactly one half of the potential difference between the fixed circuit reference voltage 20 and the ground reference 15 and it is equivalent in use to the common or reference potential of a circuit with a bipolar power supply. Other relationships between the fixed circuit reference voltage 20 and the reference offset voltage 21 are possible. The fixed circuit reference voltage 20 could be generated by a zener or bandgap reference, and such references are suitable for this compensation circuit 10. It will be shown in the detailed analysis that a precise reference is not needed and that the voltage regulation achievable from a linear regulator power supply circuit is sufficient.

A voltage controlled current source 22 connects across the power input 14 and the ground reference 15 to provide power to the resistance bridge 11 as shown in FIG. 1. The voltage controlled current source 22 has a bridge excitation output current 23 directly proportional to the fixed circuit reference voltage 20. A buffer amplifier 24 with a buffer input 25 connects to the power input 14; the buffer amplifier 24 is configured as a voltage follower generating a buffer output voltage 26 proportional to the voltage at the power input 14 without diverting any of the bridge excitation output current 23 away from the power input 14. An instrumentation amplifier 27 with a positive terminal 28 and a negative terminal 29 connects to the positive signal output 17 and negative signal output 18 respectively to generate an initial output 30 proportional to the response of the signal outputs 16.

A compensation network 31 includes an offset correction part 32 to receive the buffer output voltage 26 and the ground reference 15. The compensation network 31 generates an initial offset current 33 in response to the buffer output voltage 26 which in turn varies proportionately with the temperature change of the resistance bridge 11, thus providing the temperature dependent part of the initial offset current 33.

An offset correction amplifier 34 receives the initial offset current 33, the buffer output voltage 26, and the fixed circuit reference voltage 20 and generates a correction signal 35 to counteract offset error in the response of the signal outputs 16. The buffer output voltage 26 and the initial offset current 33 both vary proportionately to temperature change in the resistance bridge 11 and thereby provide the temperature dependent part of the correction signal 35. A reference input 36 of the instrumentation amplifier 27 receives the correction signal 35 and modifies the initial output 30 in response to the correction signal 35. The modification of the initial output 30 in the instrumentation amplifier 27 includes the nulling out of fixed and temperature dependent offset errors in the resistance bridge response.

The offset error of the resistance bridge 11 has fixed and temperature dependent parts which are counteracted by the interactions of the buffer output voltage 26, the fixed circuit reference voltage 20 and the initial offset current 33 within the offset correction amplifier 34. As will be explained in detail, the offset correction part 32 of the compensation network 31 has a single resistor to adjust the fixed part and another single resistor to adjust the temperature dependent part so that the adjustment for the fixed part does not affect the adjustment of the temperature dependent part. The offset correction amplifier 34 includes selected and configured resistors to allow the single resistor for the fixed part to adjust positive or negative values of the fixed part of the offset error. The other single resistor for the temperature dependent part adjusts positive or negative slope of the temperature dependent part of the offset error.

A programmable gain amplifier 37 receives the initial output 30 from the instrumentation amplifier 27 and provides a compensated output 38 which is independent of the resistance bridge response to applied pressure. A gain correction part 39 of the compensation network 31 has a gain resistor used to adjust the gain of the programmable gain amplifier 37 to compensate for variations in the resistance bridge response to applied pressure. The programmable gain amplifier 37 has an operational amplifier configured for either inverting or non-inverting gain and assures that the pressure response at the compensated output 38 has a fixed scale factor, regardless of the sensitivity of the uncompensated resistance bridge response.

In the preferred embodiment, the initial output 30 of the instrumentation amplifier 27 and the programmable gain amplifier 37 are measured with respect to the reference offset voltage 21 instead of the ground reference 15. This is to avoid the need for a negative power supply voltage to accommodate negative going pressure signals. Other reference schemes are possible.

At the right side of FIG. 1 the fixed circuit reference voltage 20, the reference offset voltage 21 and the compensated output 38 point to an analog to digital converter 40 which is not shown. The analog to digital converter 40 is included to point out the possibility of performing an analog to digital conversion, for further signal processing, on the ratio of the compensated output 38 to the fixed circuit reference voltage 20. This can be achieved by one of numerous techniques, and can compensate for fluctuations in the fixed circuit reference voltage 20 thereby eliminating the need for a precise fixed circuit reference voltage. The analog to digital converter is not required but its value will be demonstrated in the detailed analysis which follows.

Figure 2:
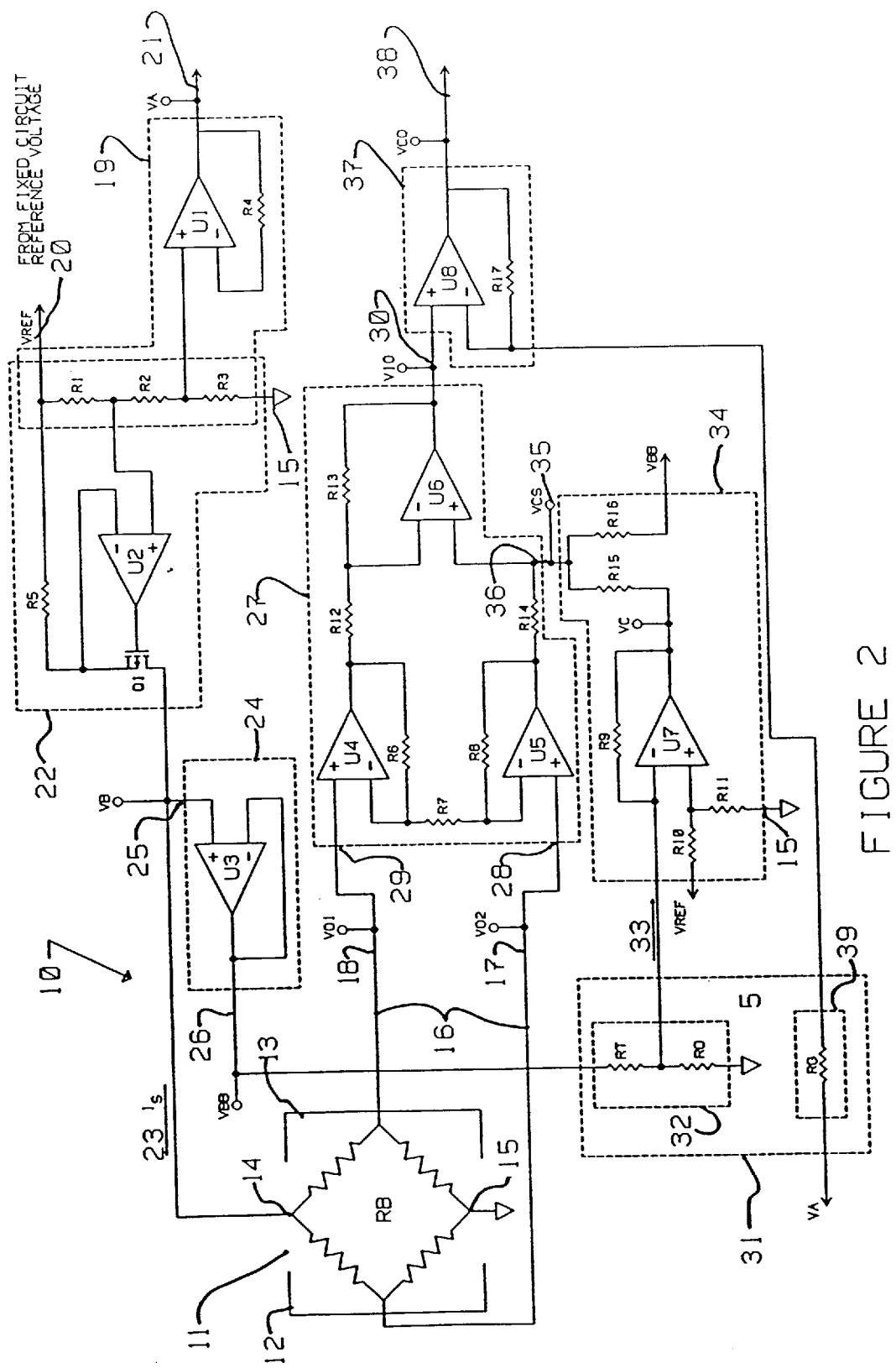
FIG. 2 is a simplified schematic of the compensation circuit, showing those circuit elements necessary to understand the invention described herein.

A detailed analysis of the compensation circuit 10 is best understood by reference to the simplified schematic of FIG. 2 wherein the circuit elements are shown. Temperature compensation can be achieved by the proper selection of three resistors. In this analysis, it will be assumed that resistor accuracy and matching tolerances, and the amplifier offset, bias current, and gain errors are kept by proper component specification to manageable levels. That is a reasonable assumption as verified by experiments.

The circuit components in FIG. 2 which comprise the blocks in FIG. 1, described previously, will be explained.

FIG. 2 shows elements of the compensation circuit 10 of FIG. 1. The desired signal at the compensated output 38 of the compensation circuit 10, with resistance bridge 11 attached is shown in FIG. 1 and has an output voltage $$V_{CO} = A_T \cdot P + V_A \tag{1}$$

Wherein $V_{CO}$=Compensated output 38 of compensation circuit 10, in mV $A_T$=Total gain factor of the resistance bridge 11 and compensation circuit 10 combined, in mv/mmHg P=Differential pressure incident upon the resistance bridge 11, in mmHg $V_A$=The reference offset voltage 21 (to allow a unipolar signal to also represent negative pressures), in volts The compensation circuit 10 insures that the effective total gain factor $A_T$ and the reference offset voltage $V_A$ shown at 21 at the compensated output 38 are the same for each resistance bridge 11, regardless of the uncompensated gain and offset of the resistance bridge response.

The uncompensated resistance bridge response is modeled as $$VO_2 - VO_1 = V_B[(OFF_V + TCO_V(\Delta T)) + S_{VO}(1 + TCS_V(\Delta T) \cdot P] \tag{2}$$

Wherein $V_B$=Excitation voltage across the power input 14 and the ground reference 15 of the resistance bridge 11, in volts $OFF_V$=Resistance bridge 11 output offset voltage, when excited by a constant voltage, at zero pressure, and at a first reference temperature T1, in $\mu V/V$ T=Resistance bridge 11 temperature, in °C.

$S_V$=Resistance bridge 11 sensitivity to pressure, when excited by a constant voltage, at the first reference temperature T1, in $\mu V/V/mmHg$ $TCO_V$=Resistance bridge 11 temperature coefficient of offset when excited by a constant voltage (first order term), in $\mu V/V/°C$.

$TCS_V\left(\dfrac{dS_V/dT}{S_V}\right)$ = Resistance bridge 11 temperature coefficient of sensitivity when excited by a constant voltage (first order term) usually given as a percentage of sensitivity, in $PPM/°C$. or $\%/°C$.

P = Differential pressure across the resistance bridge 11, identical to P in equation (1)

Equation (2) has many more terms than equation (1). There are two offset terms independent of pressure, one which is temperature dependent and one which is not, both of which are unique to an individual resistance bridge 11. There are also two pressure dependent terms, one temperature dependent and one not, both again are unique to each resistance bridge 11. The object of the compensation circuit 10 is to manipulate the resistance bridge response received from the signal outputs 16 so that the compensated output 38 removes the temperature dependent offset term from the resistance bridge response and sets the non-temperature dependent offset term of the resistance bridge response to a value that is the same for every resistance bridge 11 regardless of the actual offset of the individual resistance bridge 11; removes the temperature coefficient of the sensitivity of the resistance bridge 11 to pressure; holds the excitation at a fixed magnitude $V_B$ and provides an adjustable circuit gain $A_C$ based upon the actual $S_{VO}$ of the resistance bridge 11 whereby $$A_T = S_{VO} \cdot V_B \cdot A_C, \tag{3}$$

Consequently, $A_T$ remains a single, fixed value for all values of $S_{VO}$.

$TCO_V$ and $TCS_V$ are assumed to be linear terms. Although this may not be completely true, the second order effects of this assumption are minimal over the temperature range of the catheter tip application (15°–40° C.). Non-linearities of the temperature and pressure dependent terms may not be completely compensated by this circuit, and could be the primary cause of any error terms which remain.

The compensation circuit 10 shown in FIG. 1 and 2 uses constant current bridge excitation instead of constant voltage; this means that Equation (2), the basic resistance bridge equation, must be shown to be valid for constant current excitation as well as constant voltage. In doing this, constant current based parameters relating to the constant voltage based $OFF_V$, $TCO_V$, $S_V$, and $TCS_V$ coefficients will be developed.

The voltage $V_{REF}$ is the fixed circuit reference voltage 20. The compensation circuit 10 eliminates the effect of variations in $V_{REF}$ so that the need for a precise fixed circuit reference is eliminated and a conventionally regulated power supply voltage is sufficient as a reference for the circuit. As shown in FIG. 2, the offset reference generator 19 includes an amplifier U1, and resistors R1, R2, R3 and R4. U1 is a voltage follower generating the reference offset voltage $V_A$ 21. Resistors R1, R2, and R3 are chosen so that $$R3 = R1 + R2$$

$$V_A = \dfrac{V_{REF}}{2}$$

Therefore, $V_A$ is used as a reference potential in place of a circuit common so that a negative power supply is not required. In that way, and by careful selection of operational amplifiers, the compensation circuit 10 can be implemented with power consumption sufficiently low to provide precision operation using a small battery. Resistor R4 is chosen to cancel the bias currents of amplifier U1 enhancing precision while not affecting operation of the compensation circuit 10.

The voltage controlled current source 22 includes resistors R1, R2, R3, and R5, amplifier U2, and MOSFET Q1. Resistors R1 through R3 are shared with the offset reference generator 19 to minimize circuit bias currents. The output current is defined as $$I_S = \dfrac{V_{REF}}{R5} \left( \dfrac{R1}{R1 + R2 + R3} \right)$$

$I_S$ is the bridge excitation output current 23. Since R3 equals R1 plus R2, and if R1 equals R2 then $$I_S = \frac{V_{REF}}{4 \cdot R5}$$

The relationship is simplified to $$I_S = g_m \cdot V_{REF} \quad (4)$$

for all subsequent calculations. The gain-determining resistances are lumped into a single transconductance parameter $g_m$ which is fixed in normal applications.

The buffer amplifier 24 in FIG. 2 consists of amplifier U3, configured as a voltage follower. The buffer amplifier 24 tracks the voltage $V_B$ at the power input 14 generating $V_{BB}$, the buffer output voltage 26 which is received by the compensation network 31 and the offset correction amplifier 34. The bridge excitation output current $I_S$ 23 will typically be in the range of 100 microamperes to 1 milliampere for low power applications. Therefore U3 should be chosen so that its input bias current is sufficiently low, to insure that its contribution to current source error is negligible.

Equation (2) has the resistance bridge response in terms of a constant excitation voltage $V_B$. This response can be converted to constant current excitation, as used in the compensation circuit 10 by using the relationship between bridge excitation voltage and excitation current $$V_B = I_S \cdot RB(1 + TCRB(\Delta T)) \quad (5)$$

Wherein

RB=Resistance across the power input 14 and ground reference 15, in $\Omega$ $$TCRB \left( \frac{dRB/dT}{RB} \right) = \text{Temperature coefficient of bridge}$$

resistance *RB*, given as a percentage of

*RB*, $1^{st}$ order term, in *PPM*/°C. or %/°C.

Substituting equation (5) into equation (2) yields $$V_S = [I_S \cdot RB(1+TCRB(\Delta T))] \cdot [OFF_V + TCO_V(\Delta T) + S_V(1+TCS_V(\Delta T)) \cdot P] \quad (6)$$

Wherein $V_S$=The differential voltage across the signal outputs 16, uncompensated, in V. Or, in other words, $V_S = VO_2 - VO_1$ Equation (6) is separated into two parts for easier handling.

$$V_S = V_{SO} + V_{SP} \quad (7)$$

Wherein $V_{SO} = I_S \cdot RB(1+TCRB(\Delta T))(OFF_V + TCO_V(\Delta T))$ $V_{SP} = I_S \cdot RB(1+TCRB(\Delta T)) \cdot S_V \cdot P(1+TCS_V(\Delta T))$ $V_{SO}$ and $V_{SP}$ are the non-pressure dependent (offset) and pressure dependent terms of equation (6), respectively.

The non-pressure dependent terms are expanded and analyzed.

$$V_{SO} = I_S \cdot RB(OFF_V + TCO_V(\Delta T) + OFF_V \cdot TCRB(\Delta T) + TCRB \cdot TCO_V(\Delta T)^2)$$

Since the TCRB and $TCO_V$ terms are small with respect to the other terms, and since the range of interest of $\Delta T$ is small, the $\Delta T^2$ term is considered insignificant and may be disregarded.

$$V_{SO} = I_S \cdot [RB \cdot OFF_V + RB(TCO_V + OFF_V \cdot TCRB)(\Delta T)]$$

$$V_{SO} = I_S [OFF_I + TCO_I(\Delta T)] \quad (8)$$

or

Wherein $OFF_I = RB \cdot OFF_V$=Resistance bridge 11 output offset voltage at zero pressure and at the first reference temperature T1, when excited by constant current, in $\mu V/mA$ $TCO_I = RB\ (TCO_V + OFF_V \cdot TCRB)$=Resistance bridge 11 temperature coefficient of offset when excited by constant current, first order term, in $\Delta V/mA/°C$.

The transformation of $OFF_V$ and $TCO_V$ to $OFF_I$ and $TCO_I$ is not important if the uncompensated parameters of the resistance bridge 11 are measured under constant current excitation. In this case the constant current based parameters can be measured directly. This relationship demonstrates that the response of the resistance bridge 11 can be modelled by similar means regardless of the type of excitation. Since the compensation technique uses constant current excitation the equations for calculating the values for the resistors in the compensation network 31 need to be based upon the constant current parameters. It may be more convenient to use constant voltage to characterize the uncompensated resistance bridge 11, measuring $OFF_V$, $TCO_V$, RB, and TCRB, and deriving $OFF_I$ and $TCO_I$ as shown. Reliance on this transformation is subject to approximation errors and to sensor non-linearities.

Returning to the second half of equation (6), the pressure dependent terms are expanded.

$$V_{SP} = I_S \cdot RB \cdot S_V P [1 + TCRB(\Delta T) + TCS_V(\Delta T) + TCRB \cdot TCS_V(\Delta T)^2]$$

D is defined as $$D = TCRB + TCS_V \quad (9)$$

or $$TCRB = D - TCS_V$$

wherein $$K_1 = I_S \cdot RB \cdot S_V \cdot P$$

Substituting these relationships, $$V_{SP} = K_1 \cdot [1 + (D - TCS_V)(\Delta T) + TCS_V(\Delta T) + (D - TCS_V)(TCS_V)(\Delta T)^2]$$

$$V_{SP} = K_1 \cdot [1 + D(\Delta T) - TCS_V(\Delta T) + TCS_V(\Delta T) + D \cdot TCS_V(\Delta T)^2 - TCS_V^2(\Delta T)^2]$$

Two of these terms when added become zero, and, as with the offset terms, the $(\Delta T)^2$ terms can be eliminated, so that the equation reduces to $$V_{SP} = K_1 \cdot (1 + D(\Delta T))$$

or $$V_{SP} = I_S \cdot RB \cdot S_V \cdot P(1 + D(\Delta T))$$

rewritten as $$V_{SP} = I_S \cdot S_I (1 + TCS_I(\Delta T)) \cdot P \quad (10)$$

Wherein $S_I = S_V \cdot RB$=Resistance bridge 11 sensitivity to pressure when excited by a constant current, at the first reference temperature T1, in $\mu V/mA/mmHg$ $TCS_I = D = TCRB + TCS_V$=Temperature coefficient of sensitivity of the resistance bridge 11 when excited by a constant current, $1^{st}$ order term, in PPM/°C. or %/°C.

This is significant in that if $TCRB=-TCS_V$, then $TCS_I=0$, for constant current excitation. It is possible to design piezoresistive sensors so that the difference D can be easily held to less than 500 PPM/°C. with normal production tolerances. This means that by exciting with constant current, the temperature coefficient of sensitivity will be less than 500 PPM/°C., which is well within typical limits for piezoresistive sensors of this type compensated by other techniques. The TCS of the resistance bridge 11 needs no additional compensation; its compensation is inherent in the circuit design and no trimming is involved. The relationships herein show that the resistance bridge pressure sensitivity $S_I$, can be derived from the $S_V$ and RB parameters, in an analogous way to that shown for the offset and TC offset parameters.

The transformation from voltage based to current based excitation parameters is completed by combining the pressure dependent and non-pressure dependent parts of equation (6). Combining equations (7), (8), and (10)

$$V_S = I_S \cdot (OFF_I \cdot TCO_I(\Delta T)) + I_S \cdot S_I(1+TCS_I(\Delta T)) \cdot P$$

$$V_S = I_S[(OFF_I + TCO_I(\Delta T)) + S_I(1+TCS_I(\Delta T)) \cdot P] \quad (11)$$

The parameter transformation equations are repeated for convenience.

$$OFF_I = OFF_V \cdot RB \quad (12)$$

$$TCO_I = RB(TCO_V + OFF_V \cdot TCRB) \quad (13)$$

$$S_I = S_V \cdot RB \quad (14)$$

$$TCS_I = TCS_V + TCRB \quad (15)$$

Since sufficient compensation for TCS has been obtained, this term will be eliminated in subsequent analysis. This reduces equation (11) to $$V_S = I_S \cdot [OFF_I + TCO_I(\Delta T) + S_I \cdot P] \quad (16)$$

What remains is to establish a means of eliminating variation in the non-pressure dependent terms of each resistance bridge 11, and finally, providing the proper scaling factor.

It would appear that by using constant current excitation, the output of the resistance bridge has been made dependent upon additional sensor parameters RB and TCRB, with the possibility of errors in their characterization and repeatability over time. While this has to be considered, the use of constant current excitation offers other distinct advantages beyond the cancellation of TCS errors, which the compensation circuit 10 uses.

In producing extremely small resistance bridge pressure sensors by micromachining, the size constraints required by potential applications severely limit the space available for additional temperature sensing elements located on the chip but off the diaphragm. Usually, any additional temperature sensitive elements must be on the diaphragm if they are to be in close proximity to the resistance bridge due to size constraints. If the temperature sensing elements are not in close physical proximity to the resistance bridge, they will not accurately track the temperature of the resistance bridge and will not provide adequate temperature compensation.

The resistance of the resistance bridge has a distinct and measurable temperature characteristic, which is the source of the offset temperature coefficient errors. Therefore it is desirable, if possible, to use the temperature characteristics of the aggregate bridge resistance as a correction mechanism permitting temperature compensation without additional temperature sensitive elements on the sensor. This is made easier by the use of constant current excitation if the following relationships are considered:

$$V_B = I_S \cdot RB(1+TCRB(\Delta T))$$

or $$V_B = V_{BO} + TCV_B(\Delta T)$$

Wherein $V_{BO} = I_S \cdot RB$ = Voltage at the power input 14, at the first reference temperature T1, in V $TCV_B = I_S \cdot RB \cdot TCRB$ = Temperature coefficient of the voltage at the power input 14, in mV/°C.

Assuming a linear TCRB means that the voltage at the power input 14 $V_B$ is linearly proportional to temperature with an intercept term which is different for each resistance bridge 11, but is dependent only upon the bridge resistance RB, assuming $I_S$ is fixed. Since the resistance bridge offset is also fixed for each resistance bridge, and the TCO is assumed to be linear, The voltage at the power input 14 $V_B$ can be used to correct for the resistance bridge offset and temperature coefficient of offset, if it is properly summed into the sensor amplification circuit with the appropriate gain. This compensation technique is implemented with an operational amplifier circuit and the amount of offset and TCO correction is regulated by two resistor adjustments. The relative simplicity of the circuit is facilitated by the use of constant current excitation which enables the voltage at the power input 14 to be used as a temperature dependent correction signal.

Figure 3:
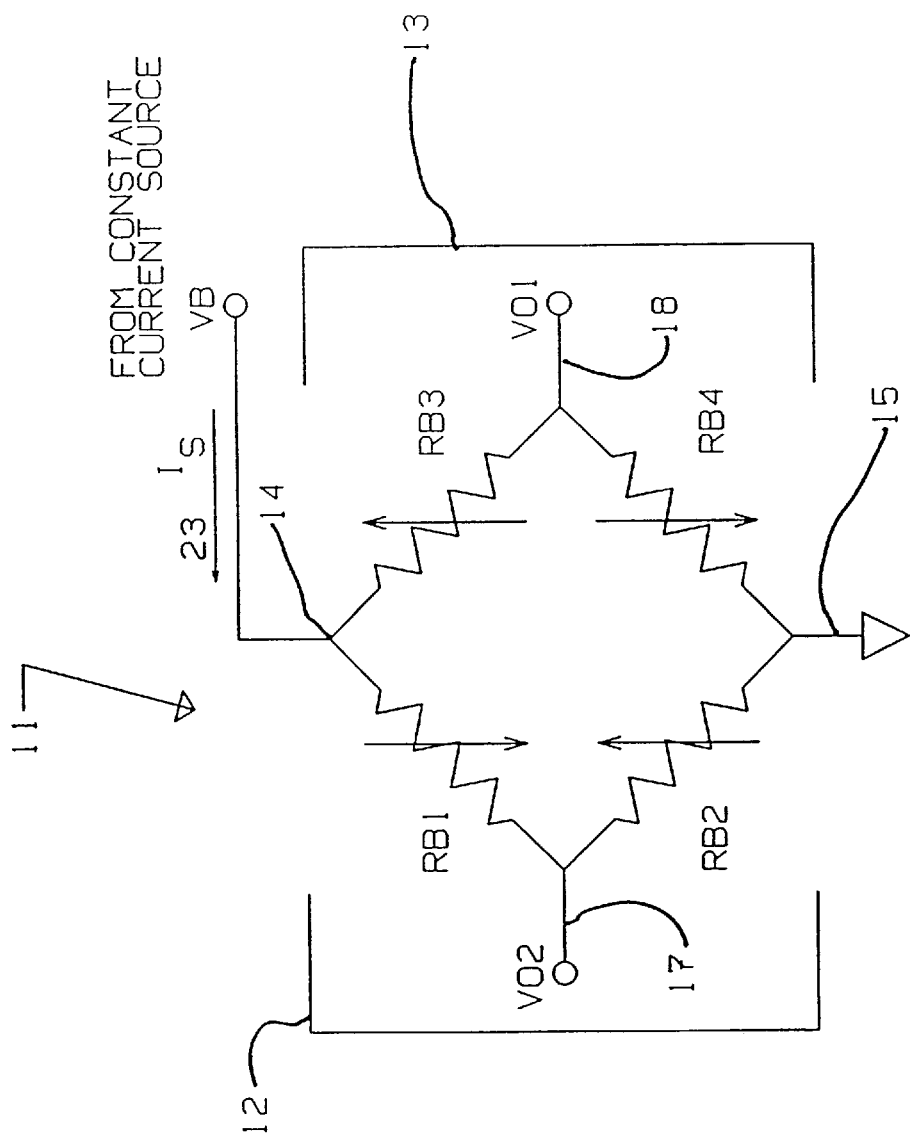
FIG. 3 is a detailed schematic of the resistance bridge, showing the interaction of the resistance elements of the bridge.

The remaining concern is the suitability of RB for use as a reliable temperature indicator in this application. Refer to FIG. 3 for a detailed schematic of resistance bridge 11 wherein RB is the series/parallel combination of the four resistors RB1 through RB4, or more precisely $$RB = (RB1 + RB2) \| (RB3 + RB4) \quad (17)$$

Since $$RB1 = RB2 = RB3 = RB4 = RBX$$

Then $$RB = 2RBX \| 2RBX$$

or $$RB = RBX$$

This relationship means that the total bridge resistance RB is equal to the nominal value of the bridge elements RB1 through RB4. In reality, there are slight differences in value among the four resistors; they are closely matched, however, by their close proximity on the diaphragm, otherwise the sensor offset would be unacceptably high. The TCRs of the individual resistors RB1 through RB4 are also tightly matched, else the bridge TCO would be unacceptably high. It is easy to show that if the TCRs of the individual resistors RB1 through RB4 are all approximately equal, and equal to TCRX, then for the entire combination TCRB=TCRX will hold true. Since the temperature across the diaphragm is constant due to its small size, then TCRB is a good indicator of resistance bridge temperature.

The factor which will most readily skew the resistance and temperature relationship is diaphragm pressure. FIG. 3 has arrows which indicate the direction (increase or decrease) of resistance change of each element with pressure. If RB2 and RB3 increase by the same amount as RB1 and RB4 decrease, then the sums of RB1+RB2, and RB3 +RB4, will remain constant, and by equation (17), RB will not change. Any mismatch in these characteristics, however, will cause RB to change somewhat with pressure. In practice, this change is very small. This effect, along with second order TCR effects, are insignificant in practice as are the second order effects on TCO and TCS.

The next step is to develop the relationships associated with the offset and TC offset compensation. Refer back to FIGS. 1 and 2 to identify the circuit blocks and components described in the analysis. In FIG. 2, the offset correction amplifier 34 includes an amplifier U7 and resistors R9, R10, R11, R15 and R16. The offset correction part 32 of the compensation network 31 has resistors RT and RO. RT primarily provides the adjustment for temperature coefficient of offset although it will be seen that it also affects the fixed offset term. RO provides the adjustment for the fixed offset, without affecting the TC offset. The offset current referenced in FIG. 1 connects to the negative input terminal of U7.

The instrumentation amplifier 27 includes amplifiers U4, U5, and U6 and resistors R6, R7, R8, R12, R13 and R14. The positive terminal 28 of the instrumentation amplifier block is the positive terminal of amplifier U5 and the negative terminal 29 of the instrumentation amplifier is the positive terminal of U4. The reference input 36 is the positive terminal of U6 which receives the correction signal $V_{CS}$. The initial output 30 is designated by voltage $V_{IO}$. Although R15 and R16 are shown as part of the offset correction amplifier 34 for simplicity of explanation, they can be part of the instrumentation amplifier 27 and will be treated in such manner in the calculations.

The basic equation for the instrumentation amplifier 27 is $$V_{IO} = G_1 \cdot G_2 (VO_2 - VO_1) + \frac{V_C}{2} + \frac{V_{BB}}{2}$$

$G_2$, the second stage gain of the instrumentation amplifier, is set equal to 1 in the preferred embodiment and can therefore be eliminated.

$$V_S = VO_2 - VO_1$$

thus $$V_{IO} = G_1 \cdot V_S + \frac{V_C}{2} + \frac{V_{BB}}{2}$$

Combining this equation with equation (16) yields $$V_{IO} = G_1 \cdot I_S \cdot [(OFF_I + TCO_I(\Delta T)) + S_I \cdot P] + \frac{V_C}{2} + \frac{V_{BB}}{2}$$

Allowing that $V_{BB}=V_B$ (since U3 is a unity gain buffer), and incorporating equation (4) and equation (5) into the expression for $V_{IO}$ above yields $$V_{IO} = G_1 \cdot g_m \cdot V_{REF} \cdot [(OFF_I + TCO_I(\Delta T)) + S_I \cdot P] + \quad (18)$$

$$\frac{V_C}{2} + \frac{g_m \cdot V_{REF} \cdot RB(1 + TCRB(\Delta T))}{2}$$

To simplify this gain equation the $V_C$ term must be expanded so that it can be stated in terms of the trim resistors RT and RO. Equation (18) becomes $$V_{IO} = G_1 \cdot g_m \cdot V_{REF} \cdot OFF_I +$$

$$G_1 \cdot g_m \cdot V_{REF} \cdot TCO_I(\Delta T) + G_1 \cdot g_m \cdot V_{REF} \cdot S_I \cdot P +$$

$$\left(\frac{R11}{R10+R11}\right) \frac{V_{REF}}{2} \left(1 + \frac{R9}{RT} + \frac{R9}{RO}\right) -$$

$$\frac{g_m \cdot V_{REF} \cdot R9 \cdot RB}{2 \cdot RT} - \frac{g_m \cdot V_{REF} \cdot R9 \cdot RB}{2 \cdot RT} \cdot TCRB(\Delta T) +$$

$$\frac{g_m \cdot V_{REF} \cdot RB}{2} + \frac{g_m \cdot V_{REF} \cdot RB}{2} \cdot TCRB(\Delta T)$$

By regrouping the terms $$V_{IO} = G_1 \cdot g_m \cdot V_{REF} \cdot OFF_I + \quad (19)$$

$$\left(\frac{R11}{R10+R11}\right) \frac{V_{REF}}{2} \left(1 + \frac{R9}{RT} + \frac{R9}{RO}\right) -$$

$$\frac{g_m \cdot V_{REF} \cdot R9 \cdot RB}{2 \cdot RT} + \frac{g_m \cdot V_{REF} \cdot RB}{2} +$$

$$G_1 \cdot g_m \cdot V_{REF} \cdot TCO_I(\Delta T) - \frac{g_m \cdot V_{REF} \cdot R9 \cdot RB}{2 \cdot RT} \cdot$$

$$TCRB(\Delta T) + \frac{g_m \cdot V_{REF} \cdot RB}{2} \cdot TCRB(\Delta T) +$$

$$G_1 \cdot g_m \cdot V_{REF} \cdot S_I \cdot P$$

While equation (19) looks complex,

The first line contains terms which are neither dependent upon pressure or temperature. These terms contribute only to the fixed offset. The second line contains terms which are all dependent upon temperature, but not pressure. These terms contribute only to the offset shift with temperature. The third line is analogous to equation (1) as it has diaphragm pressure times a constant, with no fixed offsets or temperature dependent terms.

Line one of equation (19) includes a fixed offset term that is proportional to the offset of the resistance bridge 11 while the other terms are a product of circuit parameters. Some of the other terms are positive and some negative. It should be possible to select values for the circuit parameters so that the terms which are not dependent on bridge offset add up to cancel the effect of resistance bridge offset on the output signal, for both positive and negative values of offset.

In line two of equation (19) for the temperature dependent terms one of the temperature dependent terms is proportional to the resistance bridge temperature coefficient of offset, while the other terms are proportional only to the resistance bridge temperature coefficient of resistance, and various fixed circuit parameters. As in line one of equation 19, one of the other terms is positive and one negative. In this case, the intent is to select values for the circuit parameters so that the relative weights of the positive and negative TCRB terms nullify the effect of the bridge TC offset term on the output signal.

If these goals can be simultaneously achieved, so that all terms in line one thereof can be made to add up to a single fixed value, and all of the terms in line two can add to zero, the initial output $V_{IO}$ shown at 30 in FIGS. 1 and 2 will be dependent upon pressure and not resistance bridge offset terms. In accomplishing these tasks, it is desirable to keep the number of circuit parameters to be adjusted to a minimum. It is also desirable to minimize interdependencies, particularly so that the adjustments to correct for the fixed offsets do not affect the temperature dependent correction terms. This is needed if routine fine tuning of bridge offset is to be achieved.

In equation (19) there are numerous resistor values which can be adjusted to change the fixed offset terms, without affecting the temperature dependent terms, but not vice versa. Therefore, the adjustment for the temperature dependent terms will be considered.

For the temperature effects to cancel, the temperature dependent terms must add to zero.

$$G_1 \cdot g_m \cdot V_{REF} \cdot TCO_I(\Delta T) - \frac{g_m \cdot V_{REF} \cdot R9 \cdot RB}{2 \cdot RT} \cdot TCRB(\Delta T) + \frac{g_m \cdot V_{REF} \cdot RB}{2} \cdot TCRB(\Delta T) = 0$$

Eliminating common factors, $$G_1 \cdot TCO_I - \frac{R9 \cdot RB}{2 \cdot RT} \cdot TCRB + \frac{RB}{2} \cdot TCRB = 0$$

This equation can be solved for RT as follows:

$$\frac{R9 \cdot RB}{2 \cdot RT} \cdot TCRB = G_1 \cdot TCO_I + \frac{RB}{2} \cdot TCRB \quad (20)$$

$$\frac{1}{RT} = \frac{2 \cdot G_1 \cdot TCO_I + RB \cdot TCRB}{R9 \cdot RB \cdot TCRB}$$

$$RT = \frac{R9 \cdot RB \cdot TCRB}{2 \cdot G_1 \cdot TCO_I + RB \cdot TCRB}$$

Equation (20) shows that the three temperature dependent terms will add to zero by proper selection of resistor RT. The values for bridge resistance RB, temperature coefficient of resistance TCRB and temperature coefficient of offset $TCO_I$, must be supplied from measurements on the resistance bridge 11. The values $G_1$ and R9 are circuit constants. This formula will correct for positive and negative values of $TCO_I$, as long as $$2 \cdot G_1 \cdot TCO_I + RB \cdot TCRB > 0$$

When this is the case, the computed value for RT will be greater than zero and will provide a meaningful solution as long as TCRB is positive. The TC offset correction is not dependent upon either the circuit reference voltage or the value of transconductance $g_m$. More importantly, RT is not dependent upon any of the resistors R10, R11, or RO. These resistors can be used to adjust the amount of fixed offset compensation without affecting the TC offset compensation.

Any one of the three resistors R10, R11 or RO can be chosen for offset trim, without affecting the correction for TC offset. Since the value of RT does affect offset correction, RT is selected using equation (20) and its value is then used in the computation of offset trim.

In the preferred embodiment of the compensation circuit 10, it is desired to adjust the fixed offset not to zero, but to the value of the reference offset voltage $V_A$ also designated as 21 in FIGS. 1 and 2. As explained in an earlier section, the reference offset voltage 21 has been set to one-half the value of the fixed circuit reference voltage $V_{REF}$ noted as 20 in FIGS. 1 and 2, although other voltages are possible. Therefore in solving for the value of the offset correction resistor, the sum of all of the terms in line one of equation (19) is set equal to this value. This relationship is shown in the equation that follows. $V_{REF}$ has been eliminated from this equation since it is common to every term This implies that the offset correction will not be dependent upon $V_{REF}$, which was an original design objective.

$$\frac{1}{2} = G_1 \cdot g_m \cdot OFF_I +$$

$$\left(\frac{R11}{R10 + R11}\right)\left(\frac{1}{2}\right)\left(1 + \frac{R9}{RT} + \frac{R9}{RO}\right) - \frac{g_m \cdot R9 \cdot RB}{2 \cdot RT} + \frac{g_m \cdot RB}{2}$$

RO is chosen as the resistance value for which to solve, to satisfy the above relationship. Solution in terms of RO is derived below.

$$\frac{1}{2} - G_1 \cdot g_m \cdot OFF_I =$$

$$\left(\frac{R11}{2(R10 + R11)}\right)\left(1 + \frac{R9}{RT}\right) + \frac{R9 \cdot R11}{2 \cdot RO(R10 + R11)} - \frac{g_m \cdot RB}{2}\left(\frac{R9}{RT} - 1\right)$$

$$\frac{1}{2} - G_1 \cdot g_m \cdot OFF_I =$$

$$\left(\frac{R11}{2(R10 + R11)}\right)\left(1 + \frac{R9}{RT}\right) + \frac{g_m \cdot RB}{2}\left(\frac{R9}{RT} - 1\right) = \frac{R9 \cdot R11}{2 \cdot RO(R10 + R11)}$$

$$\text{LET } Tx = \frac{1}{2} - \frac{R11}{2(R10 + R11)}\left(1 + \frac{R9}{RT}\right) + \frac{g_m \cdot RB}{2}\left(\frac{R9}{RT} - 1\right) \quad (21)$$

$$\text{AND } Ty = \frac{R9 \cdot R11}{2(R10 + R11)} \quad (22)$$

Substituting equation (21) and equation (22) in the equation immediately preceding them results in $$Tx - G_1 \cdot g_m \cdot OFF_I = \left(\frac{1}{RO}\right) \cdot Ty \quad (23)$$

$$\frac{1}{RO} = \frac{Tx - G_1 \cdot g_m \cdot OFF_I}{Ty}$$

$$RO = \frac{Ty}{Tx - G_1 \cdot g_m \cdot OFF_I}$$

Values for components in the compensation circuit 10 can be selected so that realistic ranges of values for RO and RT can be chosen, for a wide range of resistance bridge offsets, temperature coefficients of offset, resistances and temperature coefficients of resistance.

Assuming the RO and RT have been chosen in concert with a set of fixed circuit parameters to satisfy the above relationships, equation (19) reduces to $$V_{IO} = G_1 \cdot g_m \cdot V_{REF} \cdot S_I \cdot P + V_A \quad (24)$$

$G_1$, $g_m$, and $V_{REF}$ are fixed circuit constants which may be represented by a gain constant, with units of milliamperes, $$A_{C1} = G_1 \cdot g_m \cdot V_{REF} \quad (25)$$

$S_I$, the uncompensated pressure sensitivity of the resistance bridge 11, has been defined in terms of $\mu V$/per milliampere of excitation per unit pressure, due to the constant current excitation of the resistance bridge 11. Combining equation (24) and equation (25), $$V_{IO} = A_{C1} \cdot S_I \cdot P + V_A \quad (26)$$

In FIGS. 1 and 2 the programmable gain amplifier 37 consists of amplifier U8 and resistor R17, acting together with resistor RG, which is the gain correction part 39 of the compensation network 31. This provides a final circuit gain which can be trimmed, to give the desired output of equation (1)

$$V_{CO} = A_T \cdot P + V_A$$

Amplifier U8 does not amplify the reference offset voltage $V_A$ 21 since the input of U8 is referenced to $V_A$ instead of the ground reference 15. The gain of the programmable gain amplifier 37 is $A_{C2}$. The output of the programmable gain amplifier 37, which is the compensated output $V_{CO}$ shown at 38 in FIGS. 1 and 2 is represented by $$V_{CO} = A_{C1} \cdot A_{C2} \cdot S_I \cdot P + V_A \quad (27)$$

The total circuit gain term $A_T$ as defined in equation (1) is equal to $$A_T = A_{C1} \cdot A_{C2} \cdot S_I \quad (28)$$

or $$A_{C2} = \frac{A_T}{A_{C1} \cdot S_I} \quad (29)$$

U8 is a simple non-inverting amplifier whose gain is $$A_{C2} = 1 + \frac{R17}{RG} \quad (30)$$

Setting the right sides of equation (29) and equation (30) equal to each other yields $$1 + \frac{R17}{RG} = \frac{A_T}{A_{C1} \cdot S_I} \quad (31)$$

$$\frac{R17}{RG} = \frac{A_T}{A_{C1} \cdot S_I} - 1$$

$$\frac{RG}{R17} = \frac{1}{\frac{A_T}{A_{C1} \cdot S_I} - 1}$$

$$RG = \frac{R17}{\frac{A_T}{A_{C1} \cdot S_I} - 1}$$

$$RG = \frac{R17 \cdot A_{C1} \cdot S_I}{A_T - A_{C1} \cdot S_I}$$

Substituting equation (25) into equation (31)

$$RG = \frac{R17 \cdot G_1 \cdot g_m \cdot V_{REF} \cdot S_I}{A_T - G_1 \cdot g_m \cdot V_{REF} \cdot S_I} \quad (32)$$

Since R17, $G_1$, $g_m$, and $V_{REF}$ are circuit constants, the value of RG can be computed for any desired total gain $A_T$ if $S_I$ is known. The compensated output $V_{CO}$ or 38 is still dependent upon and proportional to the fixed circuit reference voltage $V_{REF}$ at 20 in FIGS. 1 and 2.

For RG to be meaningful, the denominator must be positive, or $$A_T > G_1 \cdot g_m \cdot V_{REF} \cdot S_I$$

By substituting equation (25) and equation (28) into the above relationship, it can alternately be stated that the gain $A_{C2}$ must be greater than one, which of course is the property of the non-inverting amplifier configuration for U8. An inverting amplifier can be used at this stage to enable gain reduction. This is not a problem in most situations, since it is not desirable for the instrumentation amplifier 27 to provide all of the amplification of the signal outputs 16 of the resistance bridge 11 which would normally be required for subsequent signal processing. Also if the first stage of the instrumentation amplifier 27 were to provide more gain, the resistance bridge offset errors would be amplified by that gain, requiring that the correction signal 35 vary over a wider range in order to provide the proper compensation of the resistance bridge response.

In practice, the division of circuit gain between the instrumentation amplifier 27 and the programmable gain amplifier 37 is a trade-off. There should be enough gain in the instrumentation amplifier to reject common mode errors on the signal outputs and to boost signal levels such that offset drift and noise generated by the operational amplifiers is insignificant. The gain must be limited so that the required range of the correction signal 35 and the range of the resistors in the offset correction part 32 of the compensation network 31 allow for useful implementation by laser-trimmed resistor networks.

The compensation circuit 10 is within the limits of the assumptions presented and enables the selection of three resistors to compensate a piezoresistive bridge type catheter tip pressure probe. The compensation circuit 10 requires a fixed circuit reference voltage $V_{REF}$ shown at 20. The correction of the fixed and temperature dependent offset terms of the resistance bridge response is not dependent upon $V_{REF}$. The final gain, or sensitivity to pressure of the compensated output, however, is directly proportional to $V_{REF}$.

The dependency of the compensated output 38 on the fixed circuit reference voltage 21 can be removed by circuits into which the compensated output would typically be connected for further signal processing and display. Numerous types of analog to digital converters 40 can be configured so that their digital output is proportional to the ratio of the compensated output to the fixed circuit reference voltage. The preferred embodiment of such a converter 40, not shown in detail, would be such that its output would be proportional to the difference of the compensated output 38 and the reference offset voltage 21, divided by (or proportional to) the fixed circuit reference voltage 20.

The function of this analog to digital converter 40 is shown by the relationship $$C = \frac{V_{CO} - V_A}{V_{REF}} = A_T \cdot P_{FS}$$

Wherein

C=The ratio of the compensated output 38, minus the reference offset voltage 21, to the fixed circuit reference voltage 20 for a full scale output (dimensionless)

$P_{FS}$=The number of units of pressure at full scale, in mmHg.

This can be rewritten as $$A_T = \frac{C \cdot V_{REF}}{P_{FS}}$$

Substituting this relationship into equation (32)

$$RG = \frac{R17 \cdot G_1 \cdot g_m \cdot V_{REF} \cdot S_I}{\frac{C \cdot V_{REF}}{P_{FS}} - G_1 \cdot g_m \cdot V_{REF} \cdot S_I} \qquad (33)$$

$$RG = \frac{P_{FS} \cdot R17 \cdot G_1 \cdot g_m \cdot S_I}{C - P_{FS} \cdot G_1 \cdot g_m \cdot S_I}$$

Therefore, if an analog to digital converter 40 is used, whose output is only dependent upon the ratios as shown, the dependence of gain correction part RG shown at 39 in FIG. 2 on the fixed circuit reference voltage 20 can also be eliminated. The conversion ratio C of the analog to digital converter 40, and the number of full scale units of pressure, must be known.

The terms in the resistor selection equations (20), (21), (22), (23) and equation (32) (or equation (33) if it is used in place of equation (32)), can be divided into two groups. The first group includes values for resistance, gain, transconductance and voltage associated with the parts of the compensation circuit 10 which are not directly a part of the resistance bridge 11. Those values would typically be supplied as constants, determined by the particular circuit. The compensation values selected by the above equations would apply only to a particular embodiment of the compensation circuit 10. The second group includes the resistance bridge 11 pressure and temperature response and resistance, which must be measured and calculated.

The measurements on the resistance bridge 11 are the minimum necessary to supply the bridge performance characteristics required to solve the noted equations. Other measurements to more completely determine the quality and suitability of the resistance bridge 11 for use may be used. These measurements are typically made on a sensor assembly which has completed all other manufacturing steps with the exception of the trimming of the resistor values in its compensation network 31.

Figure 4:
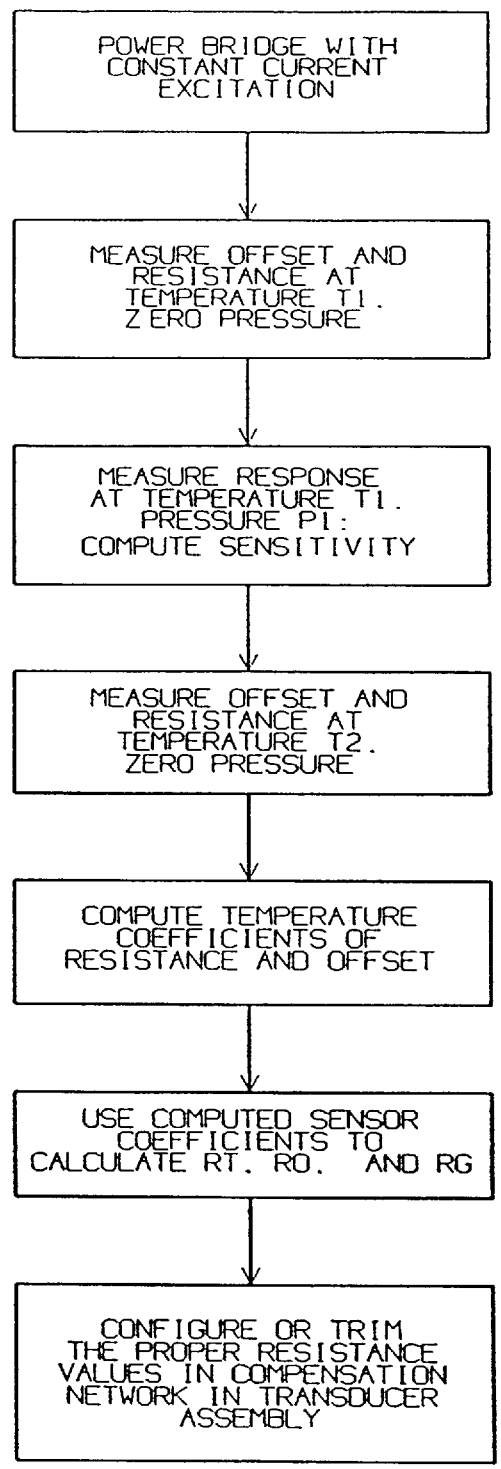
FIG. 4 is a flowchart describing the steps of the method used to compensate the resistance bridge.

The equations discussed determine the resistance values for RT, RO and RG, to compensate the resistance bridge 11. A method supplies the information needed to calculate the proper values for any resistance bridge 11 of the type described herein. The flowchart in FIG. 4 illustrates the method.

A method for compensating temperature dependent and fixed offset errors of the resistance bridge 11 has the step of energizing the resistance bridge 11 with a well regulated constant current source, connected across the power input 14 and the ground reference 15. Thereafter the step of measuring the offset and resistance of the resistance bridge 11 after bringing the resistance bridge 11 to a first temperature T1 at zero pressure and allowing the system to equilibrate is performed. Following this, the step of measuring the response of the resistance bridge 11 at the first temperature T1 takes place after applying a pressure P1 across the diaphragm of the resistance bridge 11, to determine the unit change in the output of the resistance bridge 11 with pressure.

Measuring the offset and resistance of the resistance bridge 11 after bringing the resistance bridge 11 to a second temperature T2 at zero pressure and allowing the system to equilibrate is the next step. The method includes the step of determining the unit change in the output and resistance of the resistance bridge 11 with temperature. Then the determinations and measurements of the preceding steps are used to calculate the values for the single resistor, the other single resistor and the gain resistor so that the calculated values can be used to select and include the single resistor, the other resistor and the gain resistor in the compensation network to correct for fixed and temperature dependent parts of the offset error and variations in resistance bridge 11 response to applied pressure at the resistance bridge signal outputs 16.

The preferred method has the steps of:

Energize the resistance bridge 11 with a bridge excitation current from well regulated constant current source, connected across the power input 14 and the ground reference 15. This magnitude of the current is close to the magnitude of the bridge excitation output current 23 in normal use and is verifiable by independent measurements.

Bring the temperature of the resistance bridge 11 to a first temperature T1 and allow to equilibrate. With the pressure across the diaphragm of the resistance bridge 11 held at zero pressure, a precision voltmeter measures the response across the signal outputs of the bridge. This response, divided by the bridge excitation current, provides the bridge offset term $OFF_I$. The precision voltmeter is then configured to measure the voltage across the power input 14 and the ground reference 15 of the bridge. This voltage, divided by the bridge excitation current, provides the bridge resistance RB.

Maintain the resistance bridge 11 at the first temperature T1, and apply a regulated pressure P1 across the diaphragm of the resistance bridge 11. The precision voltmeter measures the response across the signal outputs 16 of the resistance bridge 11. This response is first divided by the bridge excitation current. The difference between this value and the calculated value of $OFF_I$ is divided by the magnitude of the pressure P1 to provide the resistance bridge sensitivity term $S_I$.

Bring the temperature of the resistance bridge 11 to a second temperature T2 and allow to equilibrate. The second step is repeated at this temperature, and terms for $OFF_I$ and RB at this temperature are calculated. The difference between the $OFF_I$ terms at the two temperatures, divided by the difference between the two temperatures, provides the temperature coefficient of offset term $TCO_I$. The difference between the RB terms at the two temperatures, divided by the difference between the two temperatures, provides the temperature coefficient of resistance term TCRB.

Maintain the resistance bridge 11 at the second temperature T2 while pressure P1 is re-applied to the resistance bridge. The third step is then repeated at this temperature and $S_I$ at this temperature is calculated. The difference between the $S_I$ terms at the two temperatures divided by the difference between the two temperatures, is used to verify that the temperature coefficient of sensitivity $TCS_I$ has been effectively minimized by the use of a constant current excitation source.

Combine values calculated for the selection of resistors with the values obtained from the fixed circuit constants to determine the appropriate values for the compensation network resistors RT, RO, and RG. These values are then selected by appropriate means, and configured in the sensor assembly according to the circuit schematic shown in FIG. 2. The sensor assembly including resistance bridge 11 and compensation network 31, is then suitably configured to be connected to a circuit as shown in FIG. 2, for use as a compensated pressure sensing device.

What is claimed is:

1. A compensation circuit for a resistance bridge with a pair of arms, wherein each arm includes a pair of resistors, one of which increases with strain, and another of which decreases with strain, comprising:

a) a power input, a ground reference, a positive signal output and a negative signal output of the resistance bridge providing a response across the signal outputs as a function of pressure applied to the resistance bridge and an electrical signal applied to the power input, the response including both temperature dependent errors and fixed offset errors:

b) a voltage controlled current source connected across the power input and the ground reference, the voltage controlled current source having a bridge excitation output current directly proportional to a fixed circuit reference voltage;

c) a buffer amplifier having a buffer input connected to the power input, the buffer amplifier configured as a voltage follower generating a buffer output voltage proportional to the power input voltage;

d) an instrumentation amplifier with a positive terminal and a negative terminal connected to the positive signal output and negative signal output respectively to generate an initial output proportional to the response of the signal outputs;

e) a correction signal generating means having a correction part which consists of a single resistor for correction of temperature dependent errors and a single resistor for correction of fixed offset errors connected in series between the output of said buffer amplifier and said ground reference, said correction part generating an initial offset current at the connection of said single resistor for correction of temperature dependent errors and said single resistor for correction of fixed offset errors, said correction signal generating means having means for inversely amplifying the initial offset current, said correction signal generating means generating a correction signal on the basis of said inversely amplified initial offset current and said buffer output voltage, wherein the value of said resistor for correction of temperature dependent errors is adjusted so as to compensate for said temperature dependent errors, and the value of said resistor for correction of fixed offset errors is adjusted so as to compensate for said fixed offset errors; and f) a reference input of the instrumentation amplifier connected for receiving the correction signal to modify the initial output in response to the correction signal.

2. The compensation circuit of claim 1 wherein said correction signal generating means generates a fixed offset error correction part of said correction signal on the basis of said fixed circuit reference voltage in addition to said inversely amplified initial offset current and said buffer output voltage.

3. The compensation circuit of claim 2 wherein a programmable gain amplifier receives the initial output from the instrumentation amplifier and provides a compensated output which is independent of variations in the resistance bridge response to applied pressure.

4. The compensation circuit of claim 3 further comprising a gain resistor used to adjust the gain of the programmable gain amplifier to compensate for variations in the resistance bridge response to applied pressure.

5. The compensation circuit of claim 1 further comprising an offset reference generator to receive the fixed circuit reference voltage for generating a reference offset voltage.

6. A compensation circuit for a resistance bridge comprising:

a) a bridge comprising a power input for receiving an electrical excitation signal, a ground reference, a pressure sensitive resistance, a bridge output for providing a bridge response as a function of pressure applied to the bridge and the electrical excitation signal, wherein the bridge pressure sensitive resistance has an input resistance and the bridge response includes both temperature dependent errors and fixed offset errors;

b) an amplifying means connected to the bridge output to generate an initial output proportional to the bridge response;

c) a correction signal generating means having a compensation network which consists of a single resistor for correction of temperature dependent errors and a single resistor for correction of fixed offset errors connected in series between the initial output of said amplifying means and said ground reference, said compensation network generating an initial offset signal at the connection of said single resistor for correction of temperature dependent errors and said single resistor for correction of fixed offset errors, said correction signal generating means having means for inversely amplifying the initial offset signal, said correction signal generating means generating a correction signal on the basis of said inversely amplified initial offset signal and said offset correction input signal, wherein the value of said resistor for correction of temperature dependent errors is adjusted so as to compensate for said temperature dependent errors, and the value of said resistor for correction of fixed offset errors is adjusted so as to compensate for said fixed offset errors; and d) said amplifying means further comprising a reference input means for receiving the correction signal to modify the initial output in response to the correction signal thereby counteracting the fixed offset and temperature errors.

7. The compensation circuit of claim 6 further comprising:

a programmable gain amplifier for receiving the initial output from the amplifying means and providing a compensated output which is independent of variations in the bridge response to applied pressure, and a gain resistor used to adjust the gain of the programmable gain amplifier to compensate for variations in the bridge response to applied pressure.

8. A method for compensating both positive slope and negative slope temperature errors and fixed offset errors of the bridge in a compensation circuit of claim 7, said method having the following steps:

a) Energize the bridge with a well regulated constant current source, connected across the power input and the ground reference;

b) Measure the offset and resistance of the bridge after bringing the bridge to a first temperature T1 and at zero pressure, and allowing the system to equilibrate;

c) Measure the response of the bridge at the first temperature T1, after applying a pressure P1 across the bridge, to determine the unit change in the output of the bridge with pressure;

d) Measure the offset and resistance of the bridge after bringing the bridge to a second temperature T2 and at zero pressure, and allowing the system to equilibrate;

e) Determine the unit change in the output and resistance of the bridge with temperature;

f) Use the determinations and measurements of steps b through e to calculate the values for said single resistor for correction of temperature dependent errors, said single resistor for correction of fixed offset errors and said gain resistor; and g) Use the calculated values from step f to select and include said single resistor for correction of temperature dependent errors, said single resistor for correction of fixed offset errors and said gain resistor to correct the temperature dependent errors, fixed offset errors and variations in resistance bridge response to applied pressure at the resistance bridge outputs.

9. A method for compensating both positive slope and negative slope temperature errors and fixed offset errors of the bridge in a compensation circuit of claim 6, said method having the following steps:

a) Energize the bridge with a regulated constant current source, connected across the power input and the ground reference;

b) Measure the offset and resistance of the bridge after bringing the bridge to a first temperature T1 and at zero pressure, and allowing the system to equilibrate;

c) Measure the response of the bridge at the first temperature T1, after applying a pressure P1 across the bridge, to determine the unit change in the output of the resistance bridge with pressure;

d) Measure the offset and resistance of the bridge after bringing the bridge to a second temperature T2 and at zero pressure, and allowing the system to equilibrate;

e) Determine the unit change in the output and resistance of the with temperature;

f) Use the determinations and measurements of steps b through e to calculate the values for said single resistor for correction of temperature dependent errors and said single resistor for correction of fixed offset errors; and g) Use the calculated values from step f to select and include said single resistor for correction of temperature dependent errors and said single resistor for correction of fixed offset errors to correct the temperature dependent errors and fixed offset errors in bridge response to applied pressure at the bridge outputs.

* * * * *